United States Patent [19]
Kramer

[11] 3,799,621
[45] Mar. 26, 1974

[54] APPARATUS FOR DISPERSING PNEUMATICALLY CONVEYED MATERIAL

[75] Inventor: Walter W. Kramer, Allentown, Pa.

[73] Assignee: Fuller Company, Catasauqua, Pa.

[22] Filed: Aug. 26, 1971

[21] Appl. No.: 175,300

[52] U.S. Cl. .................. 302/17, 23/284, 302/59
[51] Int. Cl. .............................................. B65g 53/04
[58] Field of Search ........ 302/63, 59, 17; 23/288 S, 23/284

[56] References Cited
UNITED STATES PATENTS

| | | | |
|---|---|---|---|
| 2,684,869 | 7/1954 | Lapple | 302/59 |
| 930,127 | 8/1909 | Bassler | 302/59 UX |
| 2,663,595 | 12/1953 | Ardern | 302/59 |
| 3,494,858 | 2/1970 | Luckenbach | 23/288 S |
| 2,591,040 | 4/1952 | Bartow | 302/17 |
| 2,886,419 | 5/1959 | Orr et al. | 23/288 S |

Primary Examiner—Evon C. Blunk
Assistant Examiner—H. S. Lane
Attorney, Agent, or Firm—Frank H. Thomson

[57] ABSTRACT

Apparatus for dispersing pneumatically conveyed pulverulent material particularly adapted for use in dispersing pulverulent material throughout the fluid bed of a fluidized bed reactor. The apparatus includes plates which are formed in an X shape with other plates mounted at an angle to the longitudinal axis of the first plates between the branches of the X shape. The apparatus extends into the open end of the conveying pipes and into the material chamber of a fluid bed reactor. The apparatus serves to disperse the particulate material in the fluid bed.

5 Claims, 4 Drawing Figures

3,799,621

APPARATUS FOR DISPERSING PNEUMATICALLY CONVEYED MATERIAL

BACKGROUND OF THE INVENTION

This invention relates to a fluidized bed reactor and in particular to apparatus for pneumatically conveying to a fluidized bed reactor pulverulent material to be processed in the reactor and apparatus for dispersing the material throughout the fluid bed of the reactor.

The present invention is particularly designed for use with fluidized bed reactors which are used for carrying out a reaction in which the material to be processed is a particulate or pulverulent material. The invention may be used on reactors such as that shown in U. S. Pat. No. 3,361,539 for use in making Portland cement clinker, the calcining of lime or the defluorination or calcining of phosphate ores or the like, or it may be used in other applications where it is desired to disperse a pulverulent material.

In fluidized solids reactors and dryers, particulate material to be processed is supplied to a fluid bed in which the reaction takes place. In order to efficiently carry out the desired reaction, it is desirable to disperse the material to be processed throughout the fluid bed. Prior to the present invention, the material to be processed would often be supplied through an open-ended conduit either in the side of the reactor or as shown in the above mentioned U. S. patent through the reactor grid itself. The constant motion of the fluid bed is relied on to disperse the material to be processed throughout the fluid bed.

Although it is known to spray into a fluid bed liquids to be processed therein, prior to the present invention no means has been provided for spraying solids. It has been found that if some mechanical means can be used to provide an initial dispersion to the particulate material to be processed, the efficiency of the reactor can be improved and the capacity of the reactor can be increased.

SUMMARY

It is, therefore, the principal object of this invention to provide a fluidized bed reactor which includes an improved apparatus for supplying to the fluid bed pulverulent material to be processed.

It is another object of this invention to provide a mechanical means for dispersing pneumatically conveyed pulverulent material which is particularly adapted to dispersing pulverulent material throughout a fluidized mass.

It is a further object of this invention to provide an article of manufacture for use with equipment for pneumatically conveying pulverulent material to a fluidized bed reactor which will aid in increasing the capacity of a reactor.

In general, the foregoing and other objects will be carried out by providing a fluidized bed reactor including a vessel, gas permeable grid means dividing the vessel into an upper material chamber and a lower plenum chamber and adapted to support a bed of material in the material chamber, means for supplying gaseous fluid to said plenum chamber for passage through said grid to fluidize the bed of material; and conduit means for conveying a stream of pulverulent material to be processed from a source to the material chamber; the improvement comprising means mounted in said conduit means for dividing the stream of pulverulent material and dispersing the divided portions of the stream into the fluidized bed of material.

The invention will also be carried out by providing an article of manufacture for use as a flow splitter for pneumatic conveying apparatus comprising first plate means and including substantially flat plates formed in an X shape, one end of which is adapted to extend into the open end of a conduit for pneumatically conveying pulverulent material; and a plurality of second plate means, each secured to said first plate means between the branches of the X shape near the other end of the first plate means.

BRIEF DESCRIPTION OF THE DRAWINGS

The invention will be described in connection with the annexed drawings wherein.

DESCRIPTION OF THE PREFERRED EMBODIMENT

Figure 1:
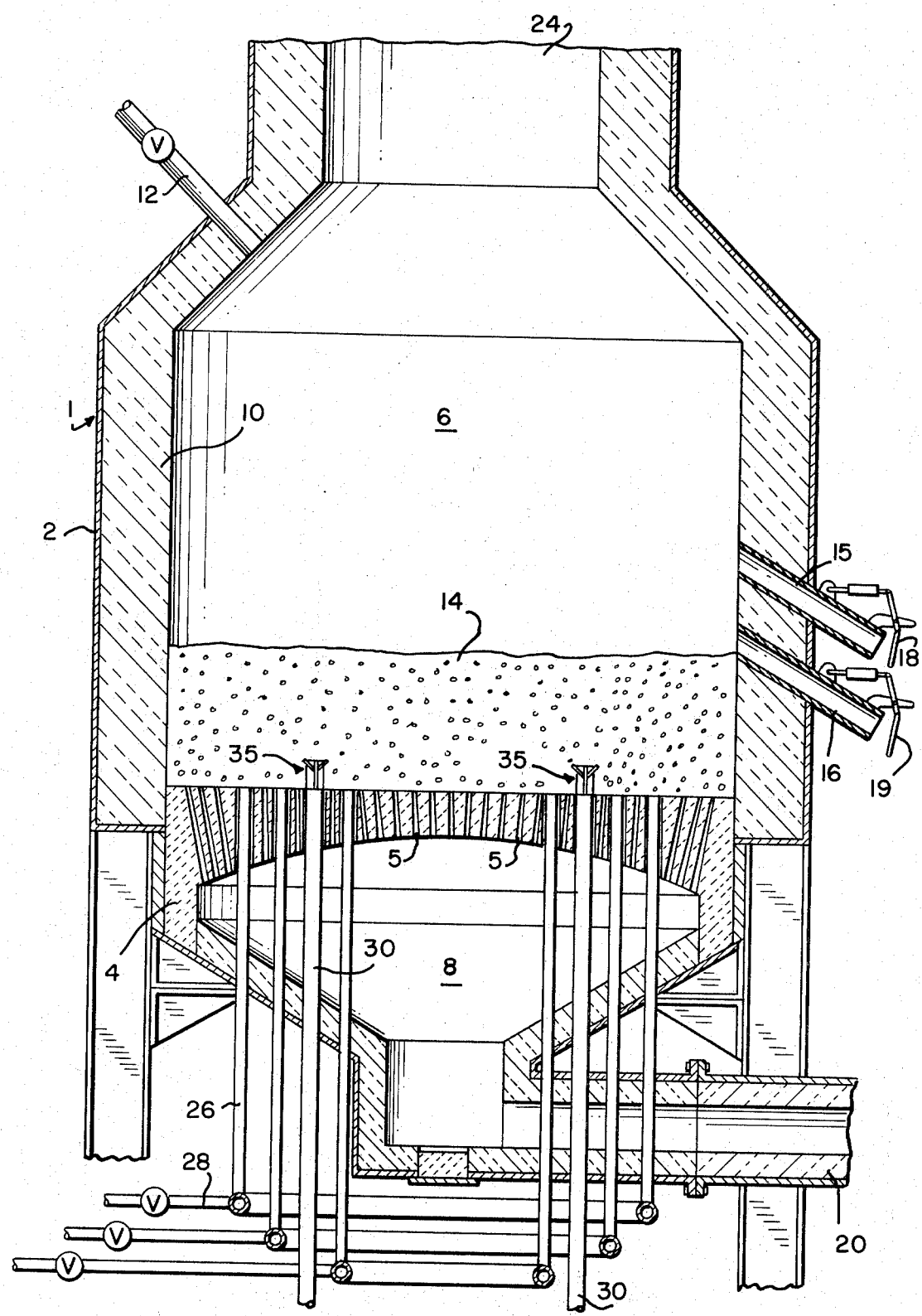
FIG. 1 is a sectional view of a fluidized bed reactor employing the present invention.

Referring to FIG. 1, there is shown a fluid bed reactor generally indicated at 1 which is of the type shown in U. S. Pat. No. 3,361,539. The reactor includes a vessel 2, a gas permeable grid 4 mounted therein and dividing the vessel into an upper material chamber 6 and a lower plenum chamber 8. The grid 4 has a plurality of holes 5 therethrough providing communication between the plenum 8 and the material chamber 6. The grid 4 may be made of any suitable material capable of withstanding the temperatures to which the reactor is to be subjected and in a preferred form it may be ceramic. The inside of the material chamber 6 may be lined with a ceramic material 10.

The reactor 1 includes a valved inlet 12 for supplying material to the material chamber 6 to make up the fluid bed 14. Overflow discharge conduits 15 and 16 provided with valves 18 and 19 control the depth of the fluid bed 14. The grid 4 is adapted to support the fluid bed 14.

The reactor includes a conduit 20 for supplying gaseous fluid to the plenum 8. In a well-known manner, gaseous fluid flows from a source (not shown) through conduit 20 to the plenum 8 and through openings 5 to fluidize the material in the material chamber 6. Off gases may be discharged from the reactor through an outlet 24.

The reactor is provided with conduits 26 for supplying fuel to the fluid bed 14 from valved conduit 28 which are connected to a source of fuel (not shown). The fuel is burned in the fluid bed 14 to carry out a reaction as disclosed in U. S. Pat. No. 3,361,539. The reactor is also provided with conduits 30 which extend through the plenum chamber 8 and the grid 4 for supplying particulate material to be processed to the fluid bed 14. The apparatus of the present invention for dispersing the particulate material is mounted in the conduits 30 and is generally designated at 35.

Figure 4:
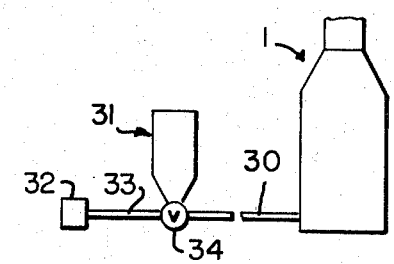
FIG. 4 is a diagrammatic view of a pneumatic conveying system which may employ the present invention.

In FIG. 4, there is shown schematically a representative pneumatic conveying system which may be used for supplying pulverulent material to be processed to the reactor. The reactor is generally indicated at 1 and a source of material to be processed is indicated at 31. A compressor is diagrammatically indicated at 32 for supplying gaseous fluid at an elevated pressure through conduit 33 which is connected to a conduit such as that indicated at 30 of the reactor shown in FIG. 1. A valve means 34 controls the admission of material to be processed into the conduit 33. The conveying system operates in a well-known manner with the compressed gas serving as the medium for conveying the pulverulent material to be processed.

Figure 2:
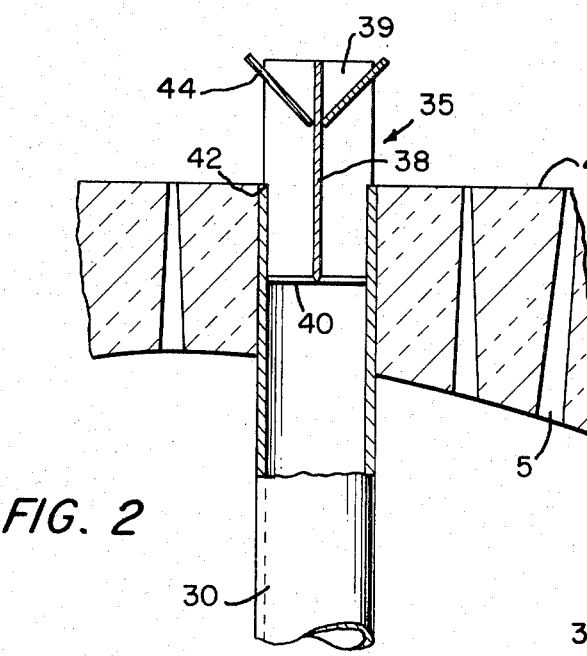
FIG. 2 is an enlarged fragmentary view of a portion of the fluidized bed reactor shown in FIG. 1.
Figure 3:
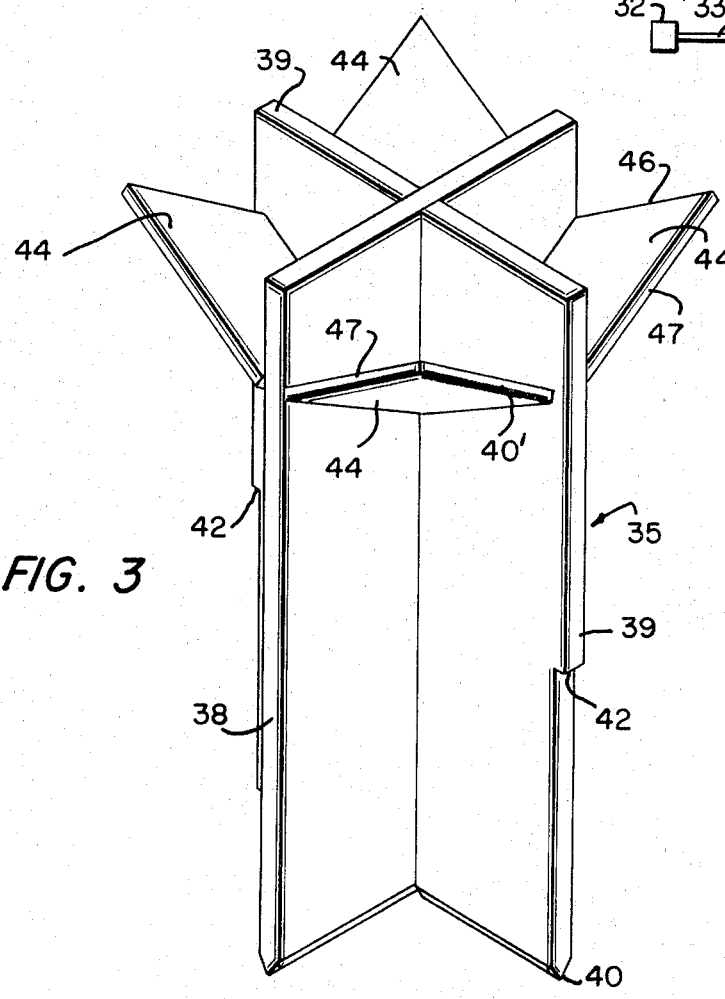
FIG. 3 is a perspective view of the material dispersing apparatus of the present invention.

Referring to FIGS. 2 and 3, the pulverulent material dispersing apparatus 35 of the present invention is clearly shown. It includes first plate means formed in an X shape and may include a substantially flat plate 38 and a pair of substantially flat plates 39 each secured as by welding to the first plate 38 to form an X or cross. The plates 38 and 39 are positioned so that they are parallel to the longitudinal axis of the conduit 30. One end of each of the plates 38 and 39 is provided with a knife edge indicated at 40. The plates 38 and 39 are dimensioned so that one end of the apparatus will extend into the open end of the conduit 30 as clearly shown in FIG. 2. The plates 39 may be provided with a stop 42 to limit the amount the apparatus slides into the conduit 30. The first plate means may be secured to the conduit 30 in any wellknown manner such as by welding. The amount the plates 38 and 39 extend into the conduit 30 will depend on the particular application but may be on the order of one diameter of the conduit 30.

Substantially flat, diamond-shaped plates 44 are secured to the plates 38 and 39 at an angle with respect to the longitudinal axis of the apparatus 35. Although illustrated as diamond shaped, the plates 44 could be triangular in configuration with the apex of the triangle positioned between the branches of the X shape. As illustrated, the plates 44 are positioned so that the top of the plates 38 and 39 extend beyond the lowest portion of the plates 44. If desired, that portion of the plates 38 and 39 above the plates 44 may be removed, but it is not deemed necessary and may add to the strength of the apparatus. As illustrated, the plates 44 are at an angle of about 45° with respect to the longitudinal axis of the plates 38 and 39, but it is believed that this angle may be substantially less than 45° and if desired, may be more than that amount.

Although the dispersing apparatus 35 has been described as being fabricated, if desired, it is believed that it could be cast or molded as a one-piece structure.

In use, as the stream of material being conveyed through the pipe 30 reaches the dispersing apparatus 35, it is divided so that a portion of the stream flows between each of the branches of the X shape. As this divided portion reaches the plate 44 which is within the fluid bed 14, the material is dispersed outwardly and upwardly into the fluid bed 14. It is believed that the diamond shape of the plates 44 results in eight flow paths being formed from the single stream in pipe 30 with each side 40' and 47 of the plate 44 serving as a guide for one of the flow paths. As the angle of the plate 44 is changed, the amount and direction of dispersion of the material is increased or decreased.

Although the invention has been described as dividing the stream of material being conveyed into four flow paths, if desired, a greater division could be made by using more main plates such as 38 and 39.

An important feature is that the apparatus 35 extends at least partially into the open end of the conduit 30. It has been found that unless the apparatus extends at least partially into the pipe 30, all of the material will tend to pass through one or two of the spaces between the branches of the X shape. However, with the splitter extending into the pipe, there is a substantially even division of material supplied to each of the flow paths.

By using the apparatus of the present invention, it has been found that the material to be processed and supplied to the fluid bed is dispersed throughout the fluid bed at a rate greater than with the arrangement used before the present invention which relied solely on the motion of the fluid bed to achieve the desired dispersion. This greater rate of dispersion permits more material to be processed in a given reactor because it insures full use of the entire fluid bed. Thus, a more efficient reactor has been provided.

It is intended that the foregoing be merely a description of a preferred embodiment and that the invention be limited solely by that which is within the scope of the appended claims.

I claim:

1. A fluidized bed reactor including a vessel, gas permeable grid means dividing the vessel into an upper material chamber and a lower plenum chamber and adapted to support a bed of material in the material chamber, means for supplying gaseous fluid to said plenum chamber for passage through said grid to fluidize the bed of material; and conduit means for conveying a stream of pulverulent material to be processed from a source to material to the the improvement comprising means mounted in said conduit means and extending into said material chamber for dividing the stream of pulverulent material and dispersing the divided portions of the stream upwardly and outwardly into the fluidized bed of material.

2. A fluidized bed reactor according to claim 1 wherein the means mounted in the conduit means for dividing the stream of pulverulent material includes primary plate means which is an X shape mounted in the end of said conduit means and extending into the material chamber for dividing the stream of pulverulent material, and a plurality of secondary diamond-shaped plate means each mounted on said primary plate means in the material chamber between the branches of the X shape; each of said diamond-shaped plate means further dividing each of said divided portions of said stream into at least two flow paths and dispersing the divided portion of the stream upwardly and outwardly into the fluidized bed of material.

3. Apparatus for pneumatically conveying pulverulent material from a source to a point at which the material is to be used comprising:

conduit means adapted to be connected at one end to a source of gaseous fluid and at its other end to the point at which the material is to be used and having an open end at the point at which the material is to be used;

means for admitting pulverulent material into the conduit means whereby a stream of pulverulent material is conveyed in said conduit means; and means mounted in the open end of said conduit means for dividing the stream of pulverulent material and dispersing the divided portions of the stream upwardly and outwardly including primary plate means having an x shape mounted in the end of said conduit means and extending out of said conduit means into the material chamber and a plurality of secondary diamond-shaped plate means each mounted on said primary plate means in the material chamber between the branches of the x shape;

each of said diamond-shaped plate means further dividing each of said divided portions of the stream into at least two flow paths.

4. A fluidized bed reactor according to claim 2 wherein the primary plate means having an X shape is formed from at least two substantially flat plates and the secondary diamond-shaped plate means are formed from a plurality of substantially flat plate means.

5. Apparatus for pneumatically conveying pulverulent material from a source to a point at which the material is to be used according to claim 3 wherein the primary plate means having an X shape is formed from at least two substantially flat plates, and the secondary diamond-shaped plate means are formed from a plurality of substantially flat plates.

* * * * *

UNITED STATES PATENT OFFICE
CERTIFICATE OF CORRECTION

Patent No. 3,799,621      Dated March 26, 1974

Inventor(s) Walter W. Kramer

It is certified that error appears in the above-identified patent and that said Letters Patent are hereby corrected as shown below:

Column 4, line 36, for "a source to material to the the improvement comprising" read --a source to the material chamber; the improvement comprising--.

Signed and sealed this 26th day of November 1974.

(SEAL)
Attest:

McCOY M. GIBSON JR.
Attesting Officer

C. MARSHALL DANN
Commissioner of Patents